(12) United States Patent
Pfefferle et al.

(10) Patent No.: US 7,485,279 B2
(45) Date of Patent: *Feb. 3, 2009

(54) GROWTH OF NANOSTRUCTURES WITH CONTROLLED DIAMETER

(75) Inventors: Lisa Pfefferle, Branford, CT (US); Gary Haller, New Haven, CT (US); Dragos Ciuparu, New Haven, CT (US)

(73) Assignee: Yale University, New Haven, CT (US)

( * ) Notice: Subject to any disclaimer, the term of this patent is extended or adjusted under 35 U.S.C. 154(b) by 670 days.

This patent is subject to a terminal disclaimer.

(21) Appl. No.: 10/726,394

(22) Filed: Dec. 2, 2003

(65) Prior Publication Data

US 2004/0247516 A1    Dec. 9, 2004

Related U.S. Application Data

(63) Continuation-in-part of application No. 10/328,857, filed on Dec. 18, 2002, now Pat. No. 7,357,983.

(60) Provisional application No. 60/341,773, filed on Dec. 18, 2001.

(51) Int. Cl.
*D01F 9/12* (2006.01)
(52) U.S. Cl. .................. 423/447.1; 423/447.3; 977/842
(58) Field of Classification Search .............. 423/447.1, 423/447.3; 977/842
See application file for complete search history.

(56) References Cited

U.S. PATENT DOCUMENTS

| 5,538,711 | A  | 7/1996  | Emerson et al.  |
|-----------|----|---------|-----------------|
| 6,159,742 | A  | 12/2000 | Lieber et al.   |
| 6,314,019 | B1 | 11/2001 | Kuekes et al.   |
| 6,333,016 | B1 | 12/2001 | Resasco et al.  |
| 6,413,487 | B1 | 7/2002  | Resasco et al.  |
| 6,896,864 | B2 | 5/2005  | Clarke          |

FOREIGN PATENT DOCUMENTS

| JP | 2002-255519    | 9/2002  |
| WO | WO-97/32571    | 9/1997  |
| WO | WO-00/73205 A1 | 12/2000 |
| WO | WO-01/16155 A1 | 3/2001  |

OTHER PUBLICATIONS

Yang et al., "Multivariate correlation and prediction of the synthesis of vanadium substituted mesoporous molecular sieves," Microporous and Mesoporous Materials, 67:245-257, (2004).
Oye et al., "A multivariate analysis of the synthesis conditions of mesoporous materials," Microporous and Mesoporous, 34:291-299, (2000).
Lim et al., "Synthesis and Characterization of Highly Ordered Co-MCM-41 for Production of Aligned Single Walled Carbon Nanotubes (SWNT)," J. Phys. Chem. B, 107:11048-11056, (2003).
Li et al., "Large-Scale Synthesis of Aligned Carbon Nanotubes," Science, 274:1701-1703, (1996).
He et al., "Growth of carbon nanotubes on Fe-loading zeolites and investigation of catalytic active center," Materials Science and Engineering C, 8-9:151-157 (1999).
Li et al., "Large-Scale Synthesis of Aligned Carbon Nanotubes," Science Dec. 6, 1996 pp. 1701-1703, USA.
Mukhopadhyay et al., "A Simple and Novel Way to Synthesize Aligned Nanotube Bundles at Low Temperature," pp. L1257-L1259 Jpn. J. Appl. Phys. vol. 37, Japan.
Zhang et al., "Template Synthesis of High-Density Carbon Nanotube Arrays," pp. 306-310 Journal of Crystal Growth 223 (2001).
Launois et al., "Carbon Nanotubes Synthesised in channels of AlPo4-5 Single Crystals: First X-Ray Scattering Investigations," pp. 99-103 Solid State Communications, 2000.
Zhang et al., "A Novel Method of Varying the Diameter of Carbon Nanotubes Formed on an Fe-Supported Y Zeolite Catalyst," pp. 383-386, Microporous and Mesoporous Materials, 1999.
Cui et al, "Nanowire Nanosensors for Highly Sensitive and Selective Detection of Biological and Chemical Species," pp. 1289-1292 Science Magazine, Aug. 17, 2001.
Rao et al., "Nanotubes," pp. 78-105 Chemphyschem, 2001.

(Continued)

*Primary Examiner*—Stuart Hendrickson
(74) *Attorney, Agent, or Firm*—Drinker, Biddle & Reath (57) ABSTRACT

Transition metal-substituted MCM-41 framework structures with a high degree of structural order and a narrow pore diameter distribution were reproducibly synthesized by a hydrothermal method using a surfactant and an anti-foaming agent. The pore size and the mesoporous volume depend linearly on the surfactant chain length. The transition metals, such as cobalt, are incorporated substitutionally and highly dispersed in the silica framework. Single wall carbon nanotubes with a narrow diameter distribution that correlates with the pore diameter of the catalytic framework structure were prepared by a Boudouard reaction. Nanostructures with a specified diameter or cross-sectional area can therefore be predictably prepared by selecting a suitable pore size of the framework structure.

32 Claims, 6 Drawing Sheets

OTHER PUBLICATIONS

Wang et al., "Two- and Three-Dimensional Alignment and Patterning of Carbon Nanotubes," pp. 165-167, Advanced Materials, Jan. 16, 2002.

Sinnott et al., "Model of Carbon Nanotube Growth Through Chemical Vapor Deposition," pp. 25-30 Chemical Physics Letters 315(1999).

Sinnott et al., "Carbon Nanotubes: Synthesis, Properties, and Applications," Critical Review in Solid State and Materials Sciences 26(3):145-249 (2001).

Fonseca et al., "Synthesis of Signel- and Multi-Wall Carbon Nanotubes Over Supported Catalysts," Applied Physics A 67, 11-22(1998).

Jiang et al., "Catalytic Growth of Carbon Nanotubes From the Internal Surface of Fe-Loading Mesoporous Molecular Sieves Materials," Materials Chemistry and Physics vol. 69, Issue 1-3, pp. 246-251, Mar. 1, 2001.

Dai, "Carbon Nanotubes: Opportunities and Challenges," Surface Science 500 (2002) pp. 218-241.

Zhao et al., "A Novel Method for Tailoring the Pore-Opening Size of MCM-41 Materials," Chem. Communications, 1999, pp. 1391-1392.

Zhao et al., "Advances in Mesoporous Molecular Sieve MCM-41," Ind. Eng. Chem. Res. 1996, 35:2075-2090.

Wu et al., "Conducting Carbon Wires in Ordered, Nanometer-Sized Channels," Science 266:1013-1015 (1994).

Cheung et al., "Diameter-Controlled Synthesis of Carbon Nanotubes," Journal of Phys. Chem. B 2002 106:2429-2433.

Lim et al., "Gas Phase Methanol Oxidation on V-MCM-41," Applied Catalysis A: General 188 (1999) 277-286.

Lim et al., "Preparation of Highly Ordered Vanadium-Substituted MCM-41: Stability and Acidic Properties," Journal of Phys. Chem. B 2002 106:8437-8448.

Kataura et al., "Optical Properties of Single-Wall Carbon Nanotubes," Synthetic Metals 103 (1999) 2555-2558.

Lee et al., "Synthesis of a New Mesoporous Carbon and its Application to Electrochemical Double-Layer Capacitors," Chem. Commun. 1999, pp. 2177-2178.

Ravikovitch et al., "Evaluation of Pore Structure Parameters of MCM-41 Catalyst Supports and Catalysts by Means of Nitrogen and Argon Adsorption," Journal of Phys. Chem. B 1997, 101:3671-3679.

Alvarez et al., "Synergism of Co and Mo in the Catalytic Production of Single-Wall Carbon Nanotubes by Decomposition of CO," Carbon 39 (2001):547-558.

Dai, H. et al. Controlled Chemical Routes to Nanotube Architectures, Physics, and Devices. J. Phys. Chem. B 103, 11246-255 (1999).

Tilbert, S.H. et al. Magnetic Field Alignment of Ordered Silicate-Surfactant Composites and Mesoporous Silica. Science 278, 264-68 (Oct. 10, 1997).

Zheng, G. et al., Chemical Vapor Deposition Growth of Well-Aligned Carbon Nanotube Patterns on Cubic Mesoporous Silica Films by Soft Lithography. Chem. Matter. 13, 2240-42 (2001).

Jun Li et al., "The Synthesis of Single-Walled Carbon Nanotubes by CVD Catalyzed with Mesoporous MCM-41 Powder" by "Science and Application of Nanotubes", Tomanek & Enbody, Kluwer Academic/Plenum, pp. 181-193 (2000).

GROWTH OF NANOSTRUCTURES WITH CONTROLLED DIAMETER

CROSS-REFERENCE TO OTHER PATENT APPLICATIONS

This application is a continuation-in-part of U.S. application Ser. No. 10/328,857, filed Dec. 18, 2002, now U.S. Pat. No. 7,357,983 and claims the benefit of U.S. provisional Patent Application No. 60/341,773, filed Dec. 18, 2001, the subject matter of which are incorporated herein by reference in their entirety.

STATEMENT REGARDING FEDERALLY SPONSORED RESEARCH AND DEVELOPMENT

This invention was made with government support under Contract Number MDA972-02-1-0010, awarded by DARPA-DSO, and under Contract Number {DE-FG0201ER15183}, awarded by DoE, Office of Basic Energy Sciences. The Government has certain rights in the invention.

BACKGROUND OF THE INVENTION

Nanostructures exhibit technologically important electronic properties and have shown promising applications, including nanoscale electronic devices, high strength materials, electron field emission devices, tips for scanning probe microscopy, and chemical sensors. One example of such nanostructures are carbon nanotubes which are seamless tubes of graphite sheets and can be either multi-walled (MWNT) or single-walled (SWNT). The structure of the SWNT is defined by how the graphite sheet is aligned in a rolled up configuration. Most electronic applications of carbon nanotubes require significant amounts of aligned SWNT that are reasonably homogeneous in diameter, length and helicity, since the electronic properties correlate both with the diameter and chirality (twist). Carbon nanotubes can be found in both metallic and semiconducting structures. Metallic nanotubes can carry large current densities while semiconducting nanotubes can be electrically switched on and off like field-effect transistors (FET's).

Single-walled carbon nanotubes are typically prepared in the presence of a particulate transition metal catalyst, such as V or Co. However, SWNT prepared using such particulate catalysts have shown a rather broad distribution of SWNT diameters, with the width of the distribution increasing with the SWNT diameter. Catalysts, in particular metal catalysts, tend to restructure and sinter under the harsh reaction conditions required for SWNT synthesis, leading to the formation of multi-faceted crystals, with each facet potentially initiating the growth of a SWNT and contributing to the heterogeneity in diameter and structure.

As a result, no economically scalable methods exist to date for reliably preparing, separating or aligning nanotubes of controlled diameter or cross-sectional area and electronic properties either by selective synthesis or through post-synthesis separation. Device development therefore is limited by the lack of control in synthesizing clean aligned nanotubes of a specified type. The inability to make controlled junctions on a nanometer scale is also a limiting factor in making particular electronic devices requiring local gate layout.

It would therefore be desirable to develop a framework material with improved control of the framework's pore size and a process for the growth of nanostructures with controlled chemical and physical properties in or on the framework material.

SUMMARY OF THE INVENTION

The systems and methods described herein are directed to the synthesis of a highly ordered transition-metal-substituted mesoporous siliceous framework and to the growth of aligned carbon nanostructures with controllable physical properties, such as a predetermined diameter or cross-sectional area and a narrow diameter distribution, in or on the framework.

According to one aspect of the invention, a method for producing nanostructures with a specified diameter or cross-sectional area includes specifying the diameter or cross-sectional area of the nanostructure und selecting a mesoporous siliceous framework structure having pores with a pore size that has a predetermined dimensional relationship with the diameter or cross-sectional area of the nanostructure. The mesoporous siliceous framework structure contains metal ions dispersed in substitutional sites and forming a source of catalytic sites. The method further includes contacting, in a reactor, the mesoporous siliceous framework structure with a carbon-containing reactant at a temperature sufficient to produce the nanostructures with the specified diameter or cross-sectional area.

According to another aspect of the invention, a catalytic framework structure suitable for growth of nanostructures with a predetermined diameter or cross-sectional area includes a mesoporous siliceous framework having pores with a certain pore size that contain metal ions dispersed in substitutional sites of the framework. The metal ions form a catalytic site when contacting a reactant at a temperature sufficient to produce the nanostructures. The size of the catalytic site is determined by a quantity of metal ions in the mesoporous siliceous framework and the radius of curvature of the pores.

It is thus feasible to grow nanostructures and nanotubes with a defined diameter or cross-sectional area and a narrow size distribution by preparing a catalytic framework structure with a pore size selected based on a previously established relationship between the pore size and the diameter or cross-sectional area of the nanostructure.

Advantageous embodiments of the invention can include one or more of the following features. The mesoporic siliceous framework can include Mobil M41S class materials, such as MCM-41 and/or MCM-48. A framework with a specific pore size can be produced by adding a surfactant with a predetermined size to an aqueous solution containing a source of silica and the metal ions, wherein the pore size correlates with the surfactant size, as determined, for example, by the alkyl chain length. The source of silica can be a colloidal silica solution, HiSil-915 and/or Cab-O-Sil L-90. A pH value between approximately 10.0 and 12.0, preferably between approximately 11.25 and 11.75, is maintained during the preparation of the framework. A framework with pore sizes ranging between approximately 1.5 and 20 nm can be designed, with pore sizes between 1.5 and 4 nm being of particular interest for the growth of SWNT.

The surfactant can include $C_nH_{2n+1}(CH_3)_3NX$ with n=10, 12, 14, 16 and 18, wherein X represents an anion, such as $OH^-$. The structural properties of the framework can be further improved by adding an anti-foaming agent to the solution. The metal ions can include Ti, V, Cr, Mn, Fe, Co, Ni, Ru, Rh, Pd, Os, Ir, Pt, and mixtures thereof. The metal ion concentration in the substitutional sites of the framework can be adjusted independently of the pore size. The concentration of the metal ions in the substitutional sites of the siliceous framework structure can be adjusted independent of the pore size, for example between 0.01 wt % to 10.00 wt %, preferably between 0.10 wt % to 10.00 wt %.

The reactant used for producing the nanostructures can include a volatile carbon-containing molecule, such as carbon monoxide (CO), whereby the nanostructures are produced by the disproportionation of CO. The catalyst can be reduced in a reducing atmosphere, such as hydrogen, in a temperature range between 300° C. and 900° C., preferably between 500° C. and 700° C., before contacting the siliceous framework with the reactant.

The nanostructures can include nanotubes having open ends, which could enhance their chemical efficacy. The concentration of the metal ions or the pore size of the mesoporous siliceous framework, or both, can be adjusted so as to control the electronic characteristics of the nanotubes, i.e., the nanotubes can be rendered semiconducting or metallic. In addition, the nanotubes can be doped, for example, with boron (for p-type conductivity) and nitrogen (for n-type conductivity). The nanotubes can be single-wall (SWNT) having a wall thickness of a single atom, or multi-wall (MWNT) having a wall thickness of two or more atoms.

The metal ions in the pore can be reduced by the reductant to form catalytic sites, with a radius of curvature of the pores controlling the reducibility of metal ions in the pore walls, and possibly also the size and structure of the catalytic sites.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The method and system described herein are directed, inter alia, to the preparation of mesoporous molecular sieve (MPMS) catalytic framework structures with a defined pore size and concentration of catalytic metal ions and to the growth of nanostructures, in particular carbon single-wall nanotubes (SWNT), in the pores of the catalytic framework structures.

It is a realization of the inventors that a framework material for the growth of SWNT should preferably allow independent control of both composition and pore size because, if they can be varied independently, selective growth of specific forms of metallic or semiconducting SWNT can be expected. The term composition refers here generally to the chemical composition, such as the concentration of metal ions in the framework, in particular near or at the exposed pore walls. Mesoporous materials of the Mobil M41S class (MCM-41 and MCM-48) with metal ions suitably incorporated in the framework as the source for the catalytic sites can provide the desired control of SWNT growth.

According to the IUPAC definition, mesoporous materials are referred to as materials having pores sizes in a range between about 2.0 nm and 20 nm, now extended to 1.5 to 20 mm. Unlike zeolites which are crystalline materials so that their pore size cannot be varied independently of the composition, the M41S class mesoporous materials (MCM-41 and MCM-48) developed by Mobil Oil Corporation has a structured pore arrangement with pore diameters ranging from 1.5-4 nm wherein the pore walls are amorphous. The pore structure and pore size can be produced independent of the substitution of transition metal ions in the framework (for dilute substitutions). A uniform pore distribution and pore size (~0.1 nm FWHM uniformity in the pore diameter) can be achieved through careful control of the growth process, which will be described below. Both the chemical composition and the pore diameter have been found to play a role in determining the structure of carbon nanotubes formed in the pores.

EXAMPLE

Synthesis of Co-MCM-41

Co-MCM-41 with cobalt as the catalytic active component in the silica framework resulted in isolated cobalt ions in the pore walls. Co-MCM-41 samples synthesized under various conditions were investigated by various characterization techniques, such as nitrogen physisorption, XRD, TEM, diffuse reflectance (DR) UV-Vis spectroscopy, and X-ray absorption.

Silica synthesis sources were HiSil® 915 from Pittsburgh Plate Glass (PPG), and tetramethyl-ammonium silicate (10 wt % silica, SACHEM Inc.). HiSil® silicas are synthetic precipitated silica thixotropes used in a variety of coatings, sealants, and adhesive systems as rheology modifiers and antisag/suspension aids. The Co source was $CoSO_4 \cdot xH_2O$ (Aldrich Chemical Co.). The quaternary ammonium surfactants $C_nH_{2n+1}(CH_3)NBr$ with n=12, 14, 16 and 18 were obtained from Aldrich Chemical Co., and with n=10 from American Tokyo Kasei. The surfactant solutions were prepared by ion-exchanging the 29 wt % (C10 and C12), 20 wt % (C14 and C16), and 10 wt % (C18) of $C_nH_{2n+1}(CH_3)_3NBr$ aqueous solution with equal molar exchange capacity of Amberjet-400 (OH) ion-exchange resin (Sigma Co.) by overnight batch mixing. The anti-foaming agent was Antifoam A from Sigma Co., a silane polymer alkyl terminated by methoxy groups. Acetic acid (Fisher Scientific) was used for pH adjustment of the synthesis solution. The pH was adjusted to values between 10 and 12, preferably between 11.25 and 11.75. In the experiments described below, the pH value was maintained at 11.5±0.1. Specific samples are hereafter designated by the alkyl chain length of the surfactant used (e.g. C10 Co-MCM-41).

Since only the hydroxyl anion ($OH^-$) is important for the process, other halogens can be used besides Br, for example Cl.

In one example, HiSil-915, tetramethyl-ammonium silicate and the Co aqueous solutions were mixed for 30 min to produce Co-MCM-41. The water-to-total silica ratio was varied from a $H_2O/Si$ mole ratio=74.4 to 86, based on the surfactant chain length. The surfactant solution was added to the prepared mixture of silica and metal and a small amount of anti-foaming agent (0.2 wt % of surfactant) was incorporated to remove excess foam produced by the surfactant. Acetic acid was added until a pH=11.5 was reached, where the pH level was maintained. After additional mixing for about 30 min, this synthesis solution was poured into a polypropylene bottle and placed in the autoclave at 100° C. for 6 days. After cooling to room temperature, the resulting solid was recovered by filtration, washed with deionized water and dried under ambient conditions. After drying, the solid was calcined by heating from room temperature to 540° C. for 20 hours under flowing He (30 ml/min), held for 1 hour at 540° C. in flowing He, followed by 6 hour calcination at 540° C. under flowing air to remove residual organics. The molar ratio of each component in the synthesis solution was controlled at $SiO_2$ surfactant: $Co:H_2O=1:0.27:0.01:X$ (X=74.4-86). Because the preparation process may cause some loss of Co and silica in the by-products, the final Co content of each sample was determined by ICP. A pure siliceous MCM-41 (without the addition of the metal salt to the synthesis solution) was also prepared with the same procedure as used for Co-MCM-41. Other suitable sources providing a supply of silicon are, for example, a colloidal silicon solution and Cab-O-Sil® L-90. (Cabot Corn., Boston Mass.). Cab-O-Sil® silicas are fumed silica used in a variety of sealants and adhesive systems as rheology modifiers and antisag/flow/reinforcement agents.

Nitrogen adsorption-desorption isotherms were measured at −196° C. with a static volumetric instrument Autosorb-1C (Quanta Chrome) to determine the pore size distribution. Other complementary techniques, such as HR-TEM, were also used to confirm the structure and the pore size. X-Ray diffraction (XRD) measurements were carried out to check if the prepared Co-MCM-41 has the characteristic hexagonal pore structure after calcination and reaction. The pore wall thickness was calculated from the XRD relationship between the lattice parameter and the spacing ($a_o=2d_{100}/\sqrt{3}$) and the aforementioned $N_2$ physisorption results.

Nitrogen physisorption was used as a standard method to compare the structure of each sample because it shows the volume averaged value, unlike XRD or TEM, which only probes a limited part or volume of the samples. The full width at half maximum (FWHM) of the pore size distribution (PSD) curve and the slope of the capillary condensation in the isotherms were determined for each sample and used as structure indices for comparisons. All samples show capillary condensation suggesting the Co-MCM-41 samples were successfully synthesized for all the employed surfactant chain lengths.

Figure 1:
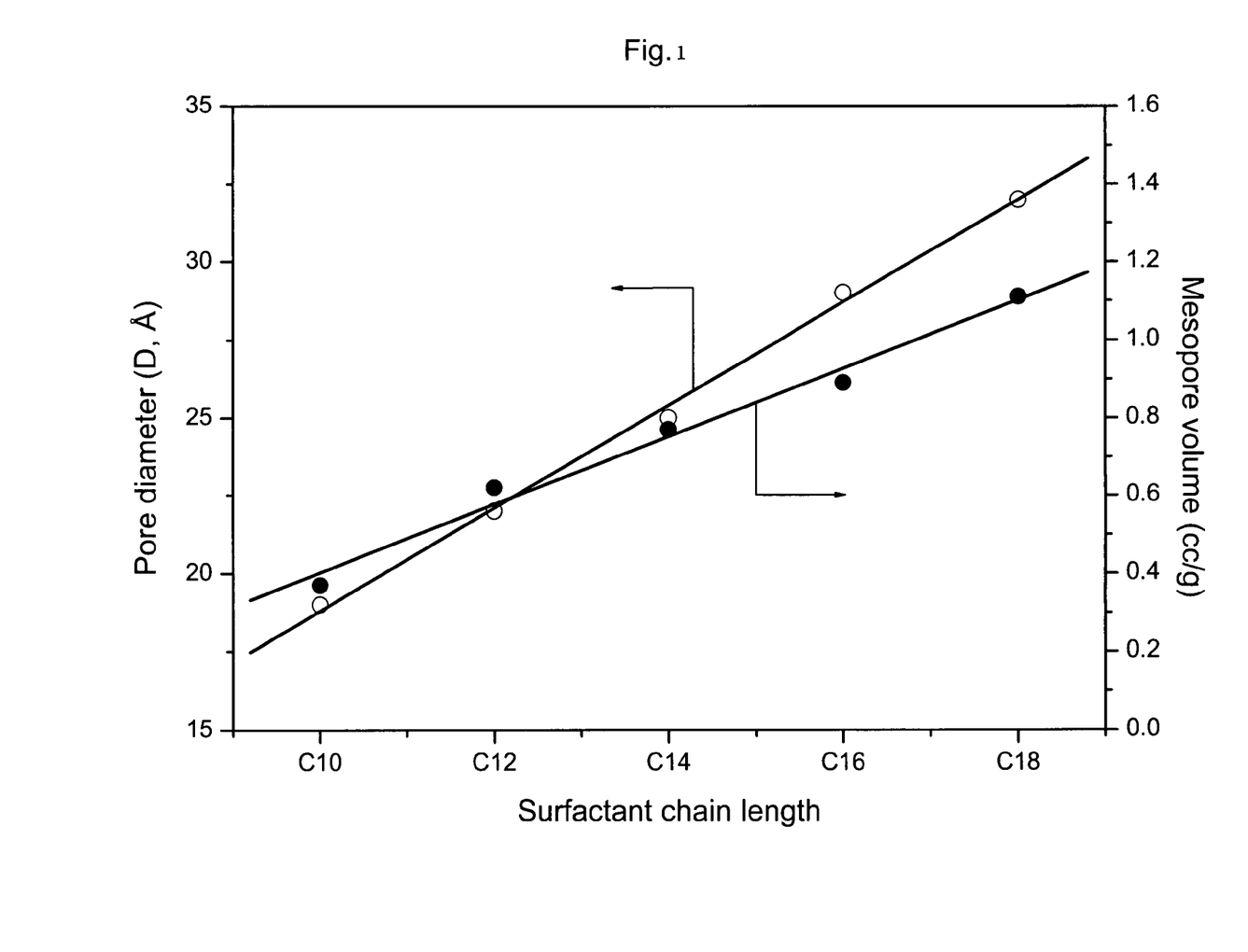
FIG. 1 is a diagram showing the relationship between surfactant chain length, pore diameter and mesoporous volume of Co-MCM-41 catalysts.

FIG. 1 depicts the relationship between surfactant chain length (C10→C18), pore diameter and mesoporous volume of the exemplary Co-MCM-41 catalysts. Both the pore size and the corresponding pore volume increased linearly with the surfactant chain length. This implies that the pore size and the mesoporous volume can be precisely controlled using the synthesis method described in this study. The mesoporous volume, defined herein as the volume of pores with diameters below 10 nm, also shows a linear dependence on the surfactant chain length. This control shows potential for controlling the size and the amount of carbon nanotubes produced in the pore system of these catalytic framework materials. Similar results can be expected with transition metals other than Co, such as Ti, V, Cr, Mn, Fe, Ni, Ru, Rh, Pd, Os, Ir, Pt, and mixtures thereof, incorporated MCM-41 samples prepared following the method described above for Co.

All samples (C10→C18) were characterized by XRD to confirm the MCM-41 structure. As expected from the nitrogen physisorption results, the MCM-41 framework structure is extremely well ordered.

DR UV-vis spectroscopy and X-ray absorption near edge structure (XANES) experiments confirm the absence of octahedrally coordinated, extra framework cobalt on the surface of the pores, suggesting a complete substitutional incorporation of cobalt in the silica framework. All samples were synthesized based on the initial concentration of 1wt % Co. The actual cobalt fraction in MCM-41 as determined by ICP analysis is listed in Table 1. The apparent loss of cobalt may be attributed to loss during sample synthesis. Each sample contains between 0.66 and 0.68 wt % of cobalt, regardless of the surfactant chain length. The number of cobalt atoms per pore was calculated using equation (1) with the following assumptions as: (1) straight cylindrical pore of 100 nm length (by TEM), (2) wall thickness is 1 nm (by XRD, $N_2$ physisorption, and TEM), (3) constant wall density that is equal to amorphous silica.

$$N_{Co}=\tfrac{1}{2}\pi[(O.D./2)^2-(I.D./2)^2]L\rho MA_N \quad (1)$$

where, $N_{co}$=number of cobalt atoms per pore
O.D.=outside diameter of a pore
I.D.=inside diameter of a pore
L=pore length (100 nm)
$\rho$=density of silica (2.2 g/cm$^3$)
M=total number of moles of cobalt atoms per unit mass (mol/g)
$A_N$=Avogadro number

TABLE 1

| Sample | Metal loading (wt %) | Analysis | wt % |
|---|---|---|---|
| C10 Co-MCM-41 | 1.0 | cobalt | 0.68 |
| C12 Co-MCM-41 | 1.0 | cobalt | 0.68 |
| C14 Co-MCM-41 | 1.0 | cobalt | 0.66 |
| C16 Co-MCM-41 | 1.0 | cobalt | 0.66 |

When the total pore volume, including inter-particle spaces, is considered, the number of cobalt atoms increases with increasing surfactant chain length. However, when only the mesoporous volume (<10 nm) is considered, samples with different pore sizes show almost the same number of cobalt atoms per pore. This suggests that most of the cobalt atoms are distributed in the pores evenly (40~50/pore), and that precisely controllable Co-MCM-41 samples can be successfully synthesized for SWNT production.

To determine how much cobalt can be incorporated substitutionally in the silica framework, a series of Co-MCM-41 samples (0.1~5 wt % Co-MCM-41) were synthesized and characterized by nitrogen physisorption. A cobalt content below 1 wt % (actual concentration is approximately 0.67 wt %, as mentioned above) does not appear to affect the structure. Up to a certain amount of metal, incorporation of cobalt improves the structure of MCM-41 by "knitting" the defective amorphous structure of the silica polymer, which results in a pore size increase while maintaining unimodal pore size distribution. This "knitting effect" of cobalt starts from 1 wt % (initial concentration) so that a cobalt content below 1 wt % is most likely insufficient to affect the structure. A large jump in the pore size accompanied by a bimodal pore size distribution was observed for a sample with 5 wt % cobalt, which may be attributable to a void volume created by extra cobalt oxide in the framework. Accordingly, it can be postulated that a maximum amount of about 4 wt. % Co may be incorporated in the MCM-41 framework without affecting the structure.

Different synthesis methods and materials have different crystallization times for the formation of an optimal MCM-41 structure. Co-MCM-41 samples were synthesized with different crystallization times (10 to 192 hours) at two different temperatures (100 and 150° C.). Experimental results suggest a preferred crystallization temperature of 100° C., and an optimum crystallization duration of 4 days for siliceous MCM-41 and 6 days for Co-MCM-41, respectively.

MCM-41 framework structures for SWNT growth must be stable under carbon deposition (reducing condition) and oxidation cycling. Co-MCM-41 sample treated under various conditions to test its stability under a range of reaction conditions. The treatment conditions intended to simulate reaction conditions were as follows: reduction at 550° C. for 2 hours with 5% $H_2$/He, re-oxidation at 550° C. for 5 hours under air, hydrothermal treatment at 550° C. for 5 hours in an air flow saturated with water vapor, and mechanical compression in a pellet press for 3 min at ~392 MPa. Independent of the treatment performed, all samples showed unmodified XRD and XANES patterns, suggesting that the pore size distribution for each sample remained unchanged. Finely dispersed cobalt atoms in the pore walls may maintain isolated local coordination so that they do not aggregate easily under reducing or oxidizing conditions. Consequently, Co-MCM-41 synthesized by the method described above is stable at temperatures under 550° C.

The resulting metal-substituted MCM-41 was found to have a parallel pore structure with hexagonal symmetry. The amorphous silica walls are less than 1 nm thick, as determined by low angle X-ray diffraction.

Table 2 lists the pore diameters and the FWHM of the pore distribution as well as the actual Co loading of Co-MCM-41 framework structures prepared with different surfactant chain lengths (C10→C18). Nominal Co loading was 1 wt. % for all samples.

TABLE 2

| Surfactant chain length (Catalyst) | Pore diameter (nm) | FWHM (nm) | Co (actual wt. %) |
|---|---|---|---|
| C10 (Co-MCM-41) | 1.90 | 0.39 | 0.68 |
| C12 (Co-MCM-41) | 2.23 | 0.31 | 0.68 |
| C14 (Co-MCM-41) | 2.5 | 0.22 | 0.66 |
| C16 (Co-MCM-41) | 2.84 | 0.22 | 0.66 |
| C18 (Co-MCM-41) | 3.2 | 0.25 | — |

The pore wall thickness was determined to be about 0.6-0.8 nm, with almost no change in the wall thickness for pore sizes in the range of 2-4 nm. The thin walls and the closely spaced (hexagonal) arrangement of the pores makes possible arrays with a high density of SWNT which has advantages for densely-packed electronic devices, chemical sensors and the like. The walls of the framework were found to be amorphous and are hence able to incorporate approximately 1 wt. % metal ions without affecting the wall structure. Cobalt and other first row transition metal ions, such as Ti, V, Cr, Mn, Fe, Co, Ni, and group VIII metals, such as Ru, Rh, Pd, Os, Ir, Pt, and mixtures thereof, can isomorphously replace $Si^{4+}$ in a pseudo-tetrahedral coordination.

Stability of the C16 MCM-41 Framework and Synthesis of Nanotubes

The controlled pore size and wall chemistry of metal-substituted MPMS catalytic framework structures, and more particularly the aforedescribed Co-MCM-41 framework structures, are relevant to the growth of carbon SWNT with controlled physical properties, such as tube diameter and possibly tube helicity, which can also determine the electronic properties of the SWNTs.

The stability of the catalytic Co-MCM-41 framework was tested separately. Prior to the growth of SWNTs, the sample was heated to 900° C. at a constant temperature ramp of 10° C./min under flowing oxygen, and then cooled to 750° C. under flowing argon. After this pretreatment, the framework was exposed to flowing CO for 4 hours and then allowed to cool to ambient temperature under argon flow. This treatment will be further referred to as one cycle. It was observed that the catalyst structure starts to change after 3 cycles, but still preserves its hexagonal structure even after the $4^{th}$ cycle. This result shows that the Co-MCM-41 synthesized following the method described here is a highly stable catalytic framework for SWNT production under harsh reaction conditions. Analysis by nitrogen physisorption gave no evidence of significant structure collapse between reaction cycles. The pore size of the reacted samples decreased by approximately 0.3 nm compared to the fresh sample, but this may result from additional contraction and dehydroxylation due to the high temperature treatment.

Exemplary carbon nanotubes were grown in Co-MCM-41 framework structures having a parallel system of pores with pore diameters. Two different Co-MCM-41 catalysts were used in this study, one with pore size of 3.3 nm and the other with a pore size of 2.6 nm, as determined by High Resolution Transmission Electron Microscopy (HR-TEM). The SWNTs are uniform in diameter and spacing. The pore size distribution in the Co-MCM-41 catalysts measured by nitrogen physisorption in a static volumetric instrument Autosorb-1C (Quanta Chrome) is of the order of 0.1 nm full width half maximum (FWHM).

The SWNTs described below were synthesized by CO disproportionation, also referred to as Boudouard reaction. The Co-MCM-41 catalyst was packed in a 10 mm internal diameter quartz reactor, heated in flowing oxygen to 750° C., purged for 10 minutes with argon and then reacted with CO for 2 hours. In addition, before reaction the catalyst can be heated in flowing hydrogen to 500° C. at 20° C./min and held at that temperature for 15 minutes. The reactor was subsequently flushed with Ar and the temperature was further raised at 20° C./min to 750° C. under flowing Ar. The Boudouard reaction was carried out for 1 hour at 750° C. in pure CO atmosphere, then the catalyst was again flushed with Ar and cooled to room temperature in Ar.

As synthesized samples and purified carbon nanotubes samples were characterized by HR-TEM, Raman Spectroscopy, UV-vis and Near-IR spectroscopy. The purification process consisted in template removal by ultrasonication for four hours in 48% HF to dissolve the silica and the cobalt from the sample. Nitrogen physisorption was also used to determine the diameter of the tubes removed from the catalyst, and measure the pore size distribution of the templates at different stages in the process.

Figure 2:
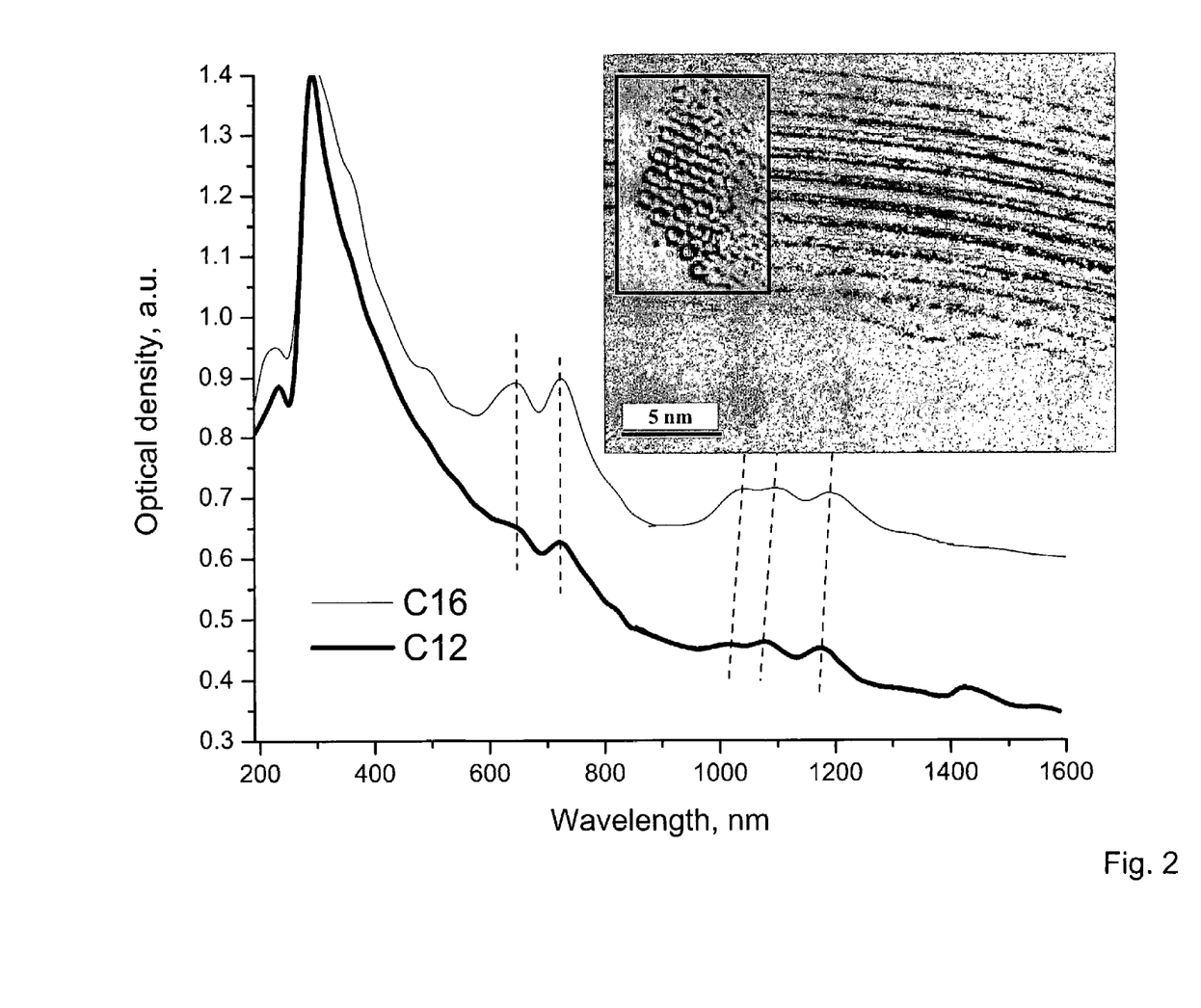
FIG. 2 shows UV-vis and near-IR spectra of SWNTs grown in C12 and C16 templates; the insert shows a TEM micrograph of an array of SWNTs grown in the C12 template.

FIG. 2 shows the UV-vis and near-IR spectra for the nanotubes grown in hydrogen pre-reduced C12 and C16 catalysts, along with a TEM image (insert) showing the diameter uniformity of the SWNTs grown in the hydrogen pre-reduced C12 template. The peak complex in the visible region was previously assigned to the first Van Hove transition of metallic tubes, while the peaks in the NIR region were attributed to the $E_{22}$ interband transitions of the semiconducting tubes. The red shift of the $E_{22}$ transition of the C12 sample in the NIR region is direct evidence for a smaller diameter of SWNTs grown in the C12 template. However, the spectral feature in the visible domain (assigned to the metallic tubes) is apparently centered at a similar wavelength for both samples.

Figure 3:
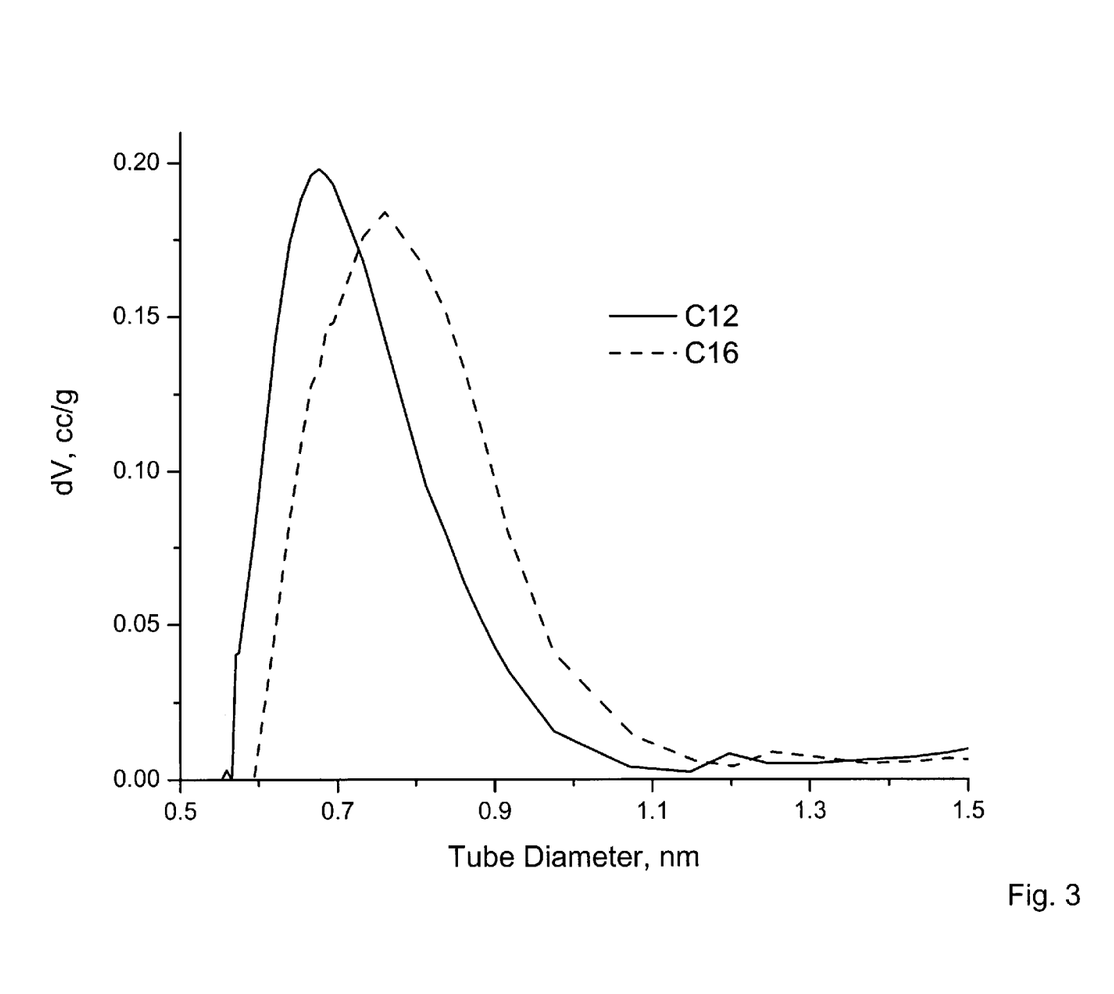
FIG. 3 shows a diagram of the SWNT tube size distribution of HF-purified SWNTs determined by nitrogen physisorption.

FIG. 3 shows the diameter distribution as measured by nitrogen physisorption on purified SWNT samples removed from the template by HF treatment. The average diameter values measured in the physisorption experiment are 0.68 and 0.76 nm for C12 and C16, respectively, thus showing a smaller SWNT diameter for the template with smaller pore diameter. The differences between the physisorption measurements and the TEM results are most likely due to the assumption that the wetting angle (used in the Kelvin equation) for liquid nitrogen on carbon is zero (see also FIG. 4). Most liquids with low surface tension have a smaller contact angle on graphite than on silica. Therefore, physisorption measurements may underestimate the nanotube diameter because it was calculated using the same angle as used for the template material, which is mostly silica. Although on the same surface (carbon in this case), liquid nitrogen has different contact angles on walls of different pore diameters because of the pore curvature. Smaller pores contact a larger area with the nitrogen molecule than wider pores, resulting in smaller contact angle and underestimation of nanotube diameter. These nanoscale phenomena are likely responsible for the differences observed between the diameter measurements by TEM and nitrogen physisorption. Also, the relatively wider distribution of tube diameters observed in the physisorption results is most likely due to defects created in the SWNT structure during the HF treatment and to the interstitial spaces between tubes. Presence of defects may also create interstitial spaces that act as micropores during physisorption measurements.

Figure 4:
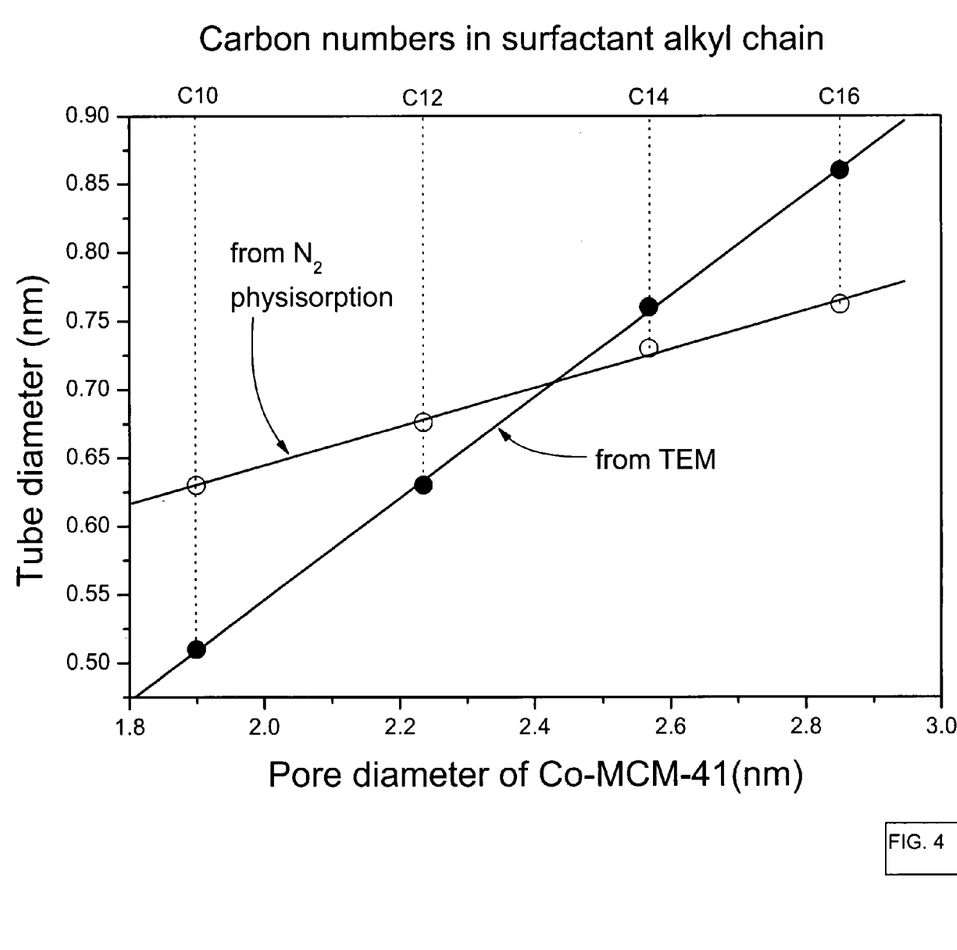
FIG. 4 shows a diagram of the SWNT tube diameter estimated from nitrogen physisorption.

FIG. 4 shows the tube diameter of the SWNTs after removal from the Co-MCM-41 framework by ultrasonication in 48% HF, as determined from nitrogen physisorption and TEM measurements, in dependence of the template pore diameter. As seen from FIG. 4, the diameters of the SWNTs produced are significantly smaller than the template pore diameter; however, the SWNT diameter correlates with the pore diameter, therefore it is likely that control is obtained through the effect of the pore size on the size of the metal clusters formed during reduction. This is also consistent with the observation that harsher conditions are required to reduce cobalt in the MCM-41 framework and the reducibility decreases with the pore diameter. To test this hypothesis catalyst samples previously exposed to the SWNT growth, as discussed above, were investigated by extended X-ray absorption fine structure (EXAFS), which can be used to determine the number and the size of nanoparticles.

Figure 5:
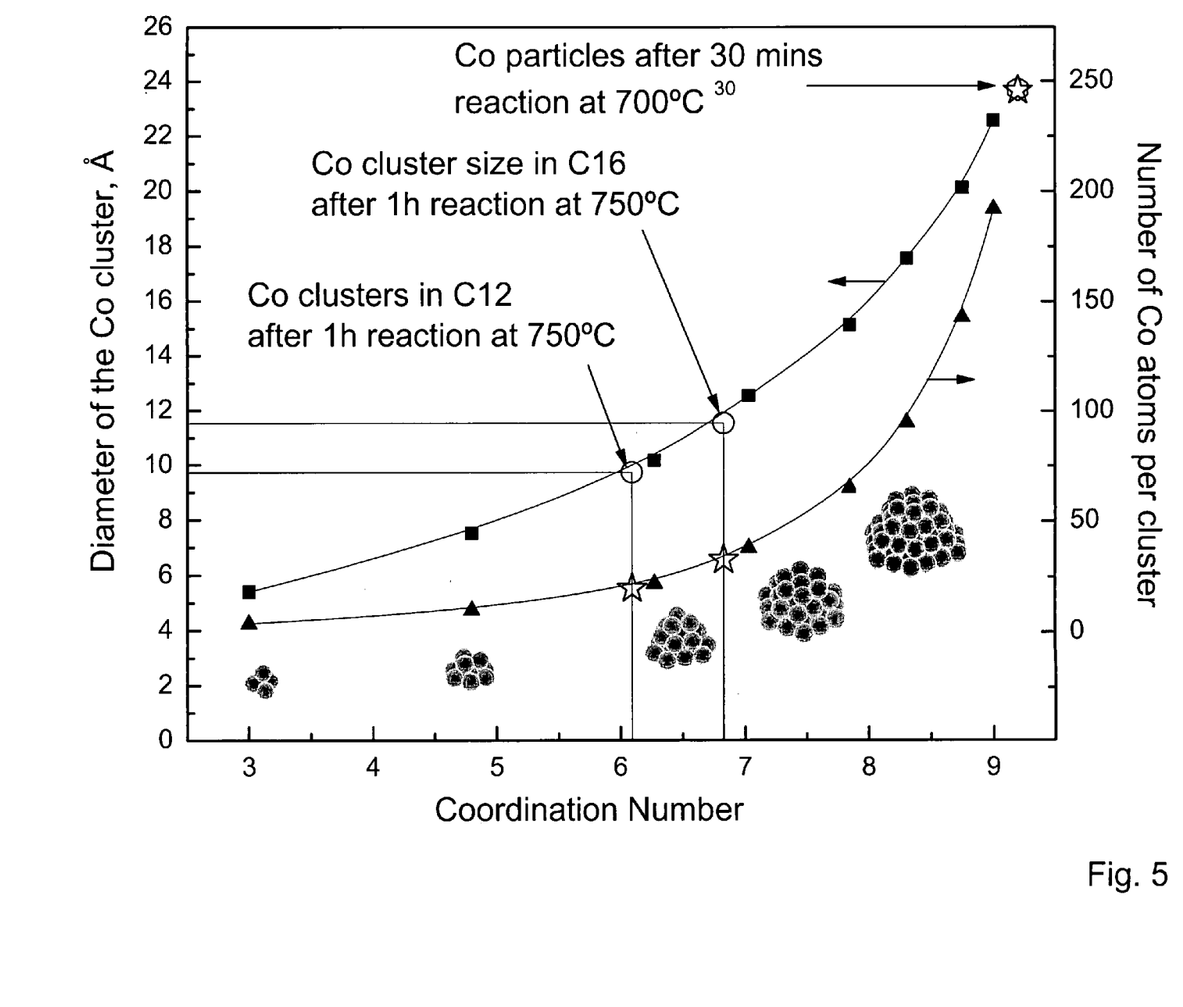
FIG. 5 shows a diagram with as upper limit of the diameter of Co clusters determined from EXAFS analysis.

Referring now to FIG. 5, a close packing models for cobalt (hcp) was used to determine the correlation between the average coordination number of the cobalt clusters and their diameters. The coordination number determined from the EXAFS spectra of hexagonally closed packed Co atoms in the metallic clusters present in the C12 and C16 samples after SWNT growth for one hour in pure CO at 750° C. are plotted on the lower curve showing the dependence of the cluster size on the coordination number of cobalt atoms in each cluster. These results suggest that the exemplary catalyst described above contains clusters with no more than 20 or 30 Co atoms for the C12 and C16 samples, respectively. Since the EXAFS spectra show a volume average coordination number, the actual metallic cluster in the MCM-41 pore may be even smaller than these because metallic particles formed outside the pore system are more mobile and can grow to larger sizes than those inside the pores. These results are consistent with TEM investigations that did not reveal the presence of metallic particles in samples after carbon deposition. The cobalt clusters produced with the MCM-41 catalyst using the aforedescribed process are significantly smaller than those observed by Alvarez et al. (Alvarez, W. E. et al., *Carbon* 2001, vol. 39, p. 547) with Co—Mo/$SiO_2$ catalysts, which have a coordination number of 9.2, even though the present catalyst was exposed 30 minutes longer to even harsher reaction conditions (i.e. 750° C. here vs. 700° C. in Alvarez et al.).

Figure 6:
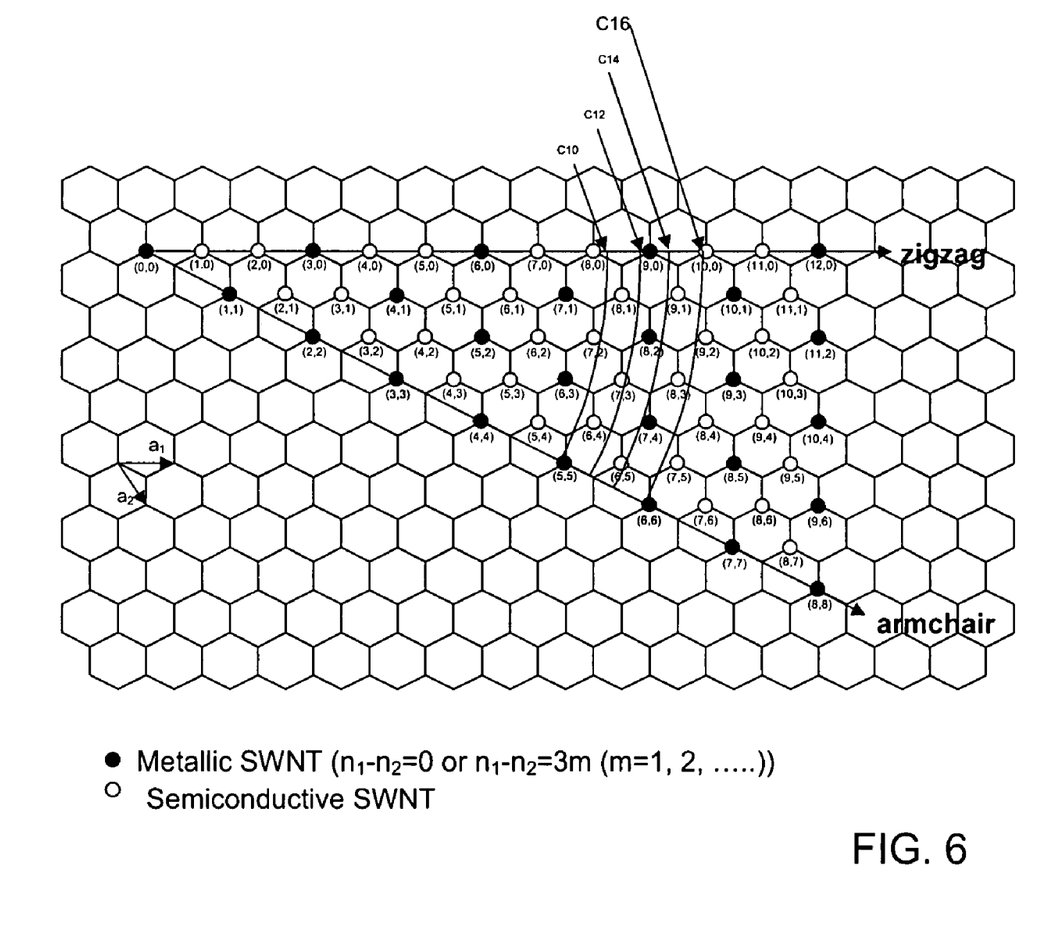
FIG. 6 illustrates schematically the expected electronic properties of SWNTs prepared using the exemplary Co-MCM-41 framework.

Although the spectroscopic and/or electronic properties of the produced SWNTs have not yet been fully characterized, they can be approximately indexed by laying a vector of length equal to the circumference on a graphene sheet (to scale from the diameters shown in FIG. 4), as depicted in FIG. 6. Nanotubes form different structural types, which can be described by the chiral vector (n,m), where n and m are integers of the vector equation $R=n*a_1+m*a_2$. While this indexing is not unique, FIG. 6 serves to suggest that over the range of Co-MCM-41 pores sizes between approximately 1.9 nm and 2.9 nm, the chiral structures can be scanned from zigzag to armchair, thereby potentially sampling both metallic and semiconductive SWNTs. The four synthesized tube sizes have approximate indices of (7,2), (7,3), (6,5) and (10,0) for respective framework pore diameters of 1.9, 2.2, 2.6 and 2.9 nm (with C10, C12, C14 and C16 alkyl surfactants used in the preparation of Co-MCM-41). The predicted tube diameters calculated from the geometric formula $d=(n^2+m^2+nm)^{1/2}$ (0.0783) are 0.64, 0.70, 0.75 and 0.78 nm, respectively, wherein the value 0.0783 nm represents the C—C bond length. The calculated diameters are systematically greater by 0.01-0.02 nm than the diameters determined form nitrogen desorption isotherms. The electrical conductivity of semiconducting carbon SWNTs can also be changed by doping with Group III materials, such as boron, and Group V materials, such as nitrogen.

The chirality appears to correlate with the wall chemistry, i.e., the concentration of catalytic sites in the pores. Lowering the concentration metal ions at the catalytic sites from above 0.5 wt. % to below approximately 0.1 wt. % is expected to shift the balance of produced SWNT from predominantly metallic to predominantly semiconducting. The achieved separate controllability of pore size and pore wall chemistry is hence an important feature for the preparation of SWNT with controllable electronic properties.

The exceptionally uniform pore size distribution of the catalytic framework and the resulting size uniformity of the SWNT appears to be the result of the relative stability of the metal ions substituted in the framework. The metal ions substitutionally incorporated in the silica framework are difficult to remove from the pore walls, thereby advantageously preventing sintering of the catalytic sites and the formation of large metal particles even under multiple cycling (synthesis of SWNT followed by their oxidative removal) of the Co-MCM-41 under reaction conditions. The SWNT size is hence determined by the framework pore size and wall chemistry rather than by externally introduced metal particle clusters.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for producing a nanostructure with a specified diameter or cross-sectional area, comprising: specifying the diameter or cross-sectional area of the nanostructure; selecting a mesoporous siliceous framework having pores with a pore size that has a predetermined dimensional relationship with the diameter or cross-sectional area of the nanostructure, said mesoporous siliceous framework containing metal ions dispersed in substitutional sites and forming a source of catalytic sites; and contacting, in a reactor, the mesoporous siliceous framework with a reactant at a temperature sufficient to produce the nanostructures with the specified diameter or cross-sectional area.

2. The method of claim 1, wherein the siliceous framework comprises a structure selected from the M41S class of materials.

3. The method of claim 2, wherein the M41S class of materials comprises MCM-41 or MCM-48.

4. The method of claim 1, wherein the predetermined pore size is between 1.5 and 20 nm.

5. The method of claim 1, wherein the predetermined pore size is between 1.5 and 4 nm.

6. The method of claim 1, wherein providing the siliceous framework includes adding a surfactant of a predetermined size to an aqueous solution containing a source of silicon and the metal ion.

7. The method of claim 6, wherein the size of the surfactant correlates with an alkyl chain length.

8. The method of claim 6, wherein the pore size correlates with the size of the surfactant.

9. The method of claim 6, wherein the surfactant comprises $C_nH_{2n+1}(CH_3)_3NX$ with n=10, 12, 14, 16 and 18, wherein X comprises an anion.

10. The method of claim 6, further comprising adding an anti-foaming agent to the aqueous solution.

11. The method of claim 1, wherein the metal ions are selected from the group consisting of Ti, V, Cr, Mn, Fe, Co, Ni, Ru, Rh, Pd, Os, Ir, Pt, and mixtures thereof.

12. The method of claim 1, and further comprising changing a concentration of the metal ions in the substitutional sites of the siliceous framework independent of the pore size in the concentration range of the metal ion between 0.01 wt % to 10.00 wt %.

13. The method of claim 1, and further comprising changing a concentration of the metal ions in the substitutional sites of the siliceous framework independent of the pore size the concentration range of the metal ion between 0.10 wt % to 10.00 wt %.

14. The method of claim 1, wherein the reactant comprises a volatile carbon-containing molecule.

15. The method of claim 14, wherein the carbon-containing reactant comprises CO.

16. The method of claim 1, wherein the nanostructures are carbon nanostructures produced by disproportionation of CO.

17. The method of claim 6, and further comprising maintaining a pH value of the aqueous solution between approximately 10.0 and 12.0.

18. The method of claim 6, and further comprising maintaining a pH value of the aqueous solution between approximately 11.25 and 11.75.

19. The method of claim 6, wherein the source of silicon comprises a colloidal silica solution.

20. The method of claim 6, wherein the source of silicon comprises precipitated silica.

21. The method of claim 6, wherein the source of silicon comprises fumed silica.

22. The method of claim 1, and further comprising reducing the catalyst with a reductant in a temperature range between 300° C. and 900° C. before contacting the siliceous framework with the reactant.

23. The method of claim 22 wherein the reductant is hydrogen.

24. The method of claim 22 wherein the reductant is hydrogen and the reduction temperature is between 500° C. and 700° C.

25. The method of claim 1, wherein the nanostructures comprise nanotubes having open ends.

26. The method of claim 1, wherein the nanostructure comprises nanotubes and at least one of a concentration of the metal ions and the pore size of the mesoporous siliceous framework is adjusted so as to control an electronic characteristic of the nanotubes.

27. The method of claim 26, and further comprising doping the nanotubes with boron or nitrogen to control the electronic characteristic of the nanotubes.

28. The method of claim 26, wherein the electronic characteristic is one of metallic and semiconducting.

29. The method of claim 1, wherein the nanostructures comprise single-wall nanotubes (SWNT).

30. The method of claim 1, wherein the nanostructures comprise multi-wall nanotubes (MWNT).

31. The method of claim 1, wherein the metal ions in the pore are reduced by a reductant to form catalytic sites, with a radius of curvature of the pores controlling reducibility of metal ions in the pore walls.

32. The method of claim 1, wherein the metal ions in the pore are reduced by a reductant to form catalytic sites, with a radius of curvature of the pores controlling both reducibility of metal ions in the pore walls and a size and structure of the catalytic sites.

* * * * *

UNITED STATES PATENT AND TRADEMARK OFFICE
CERTIFICATE OF CORRECTION

| | | |
|---|---|---|
| PATENT NO. | : 7,485,279 B2 | Page 1 of 1 |
| APPLICATION NO. | : 10/726394 | |
| DATED | : February 3, 2009 | |
| INVENTOR(S) | : Pfefferle et al. | |

It is certified that error appears in the above-identified patent and that said Letters Patent is hereby corrected as shown below:

Col. 1, beginning at line 14, please delete the entire paragraph beginning at lines 14 through 21 and replace with the following paragraph:

-- STATEMENT REGARDING FEDERALLY SPONSORED RESEARCH OR DEVELOPMENT

This invention was made with government support under DE-FG02-01ER15183 awarded by Department of Energy. The government has certain rights in the invention. --

Signed and Sealed this
Thirty-first Day of January, 2012

David J. Kappos
*Director of the United States Patent and Trademark Office*